Figure 7:
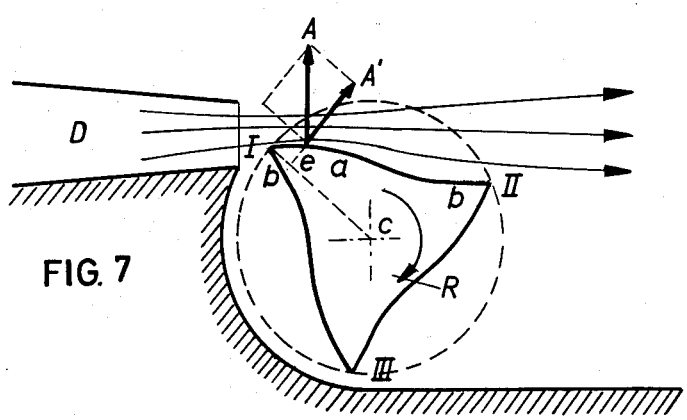

Aug. 31, 1965 L. L. POHL 3,203,182
TRANSVERSE FLOW TURBINES
Filed April 3, 1963 3 Sheets-Sheet 1
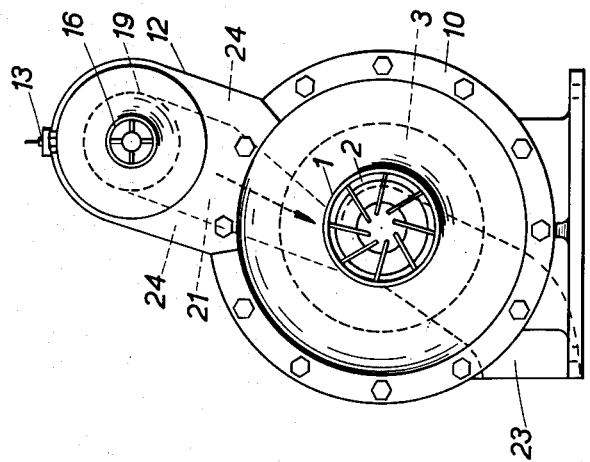
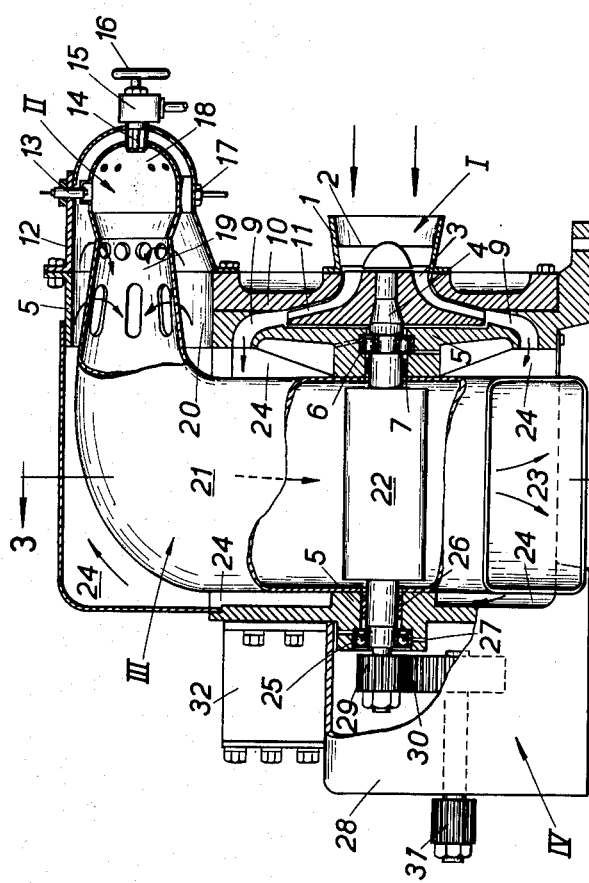
INVENTOR
LOTHAR L. POHL
ATTORNEYS

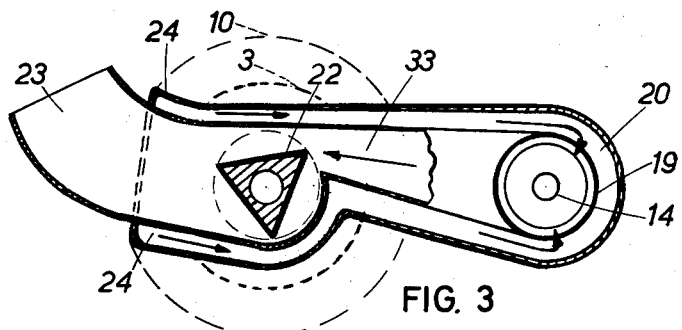
FIG. 3
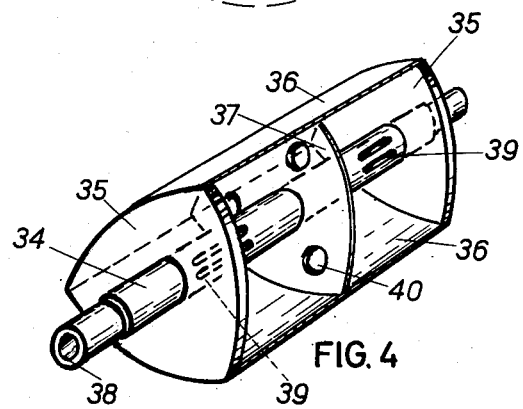
FIG. 4
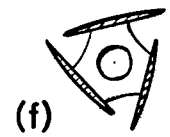
(f)
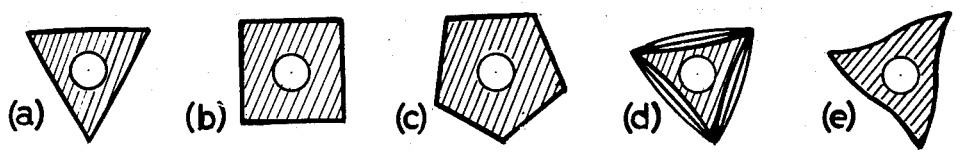
FIG. 5
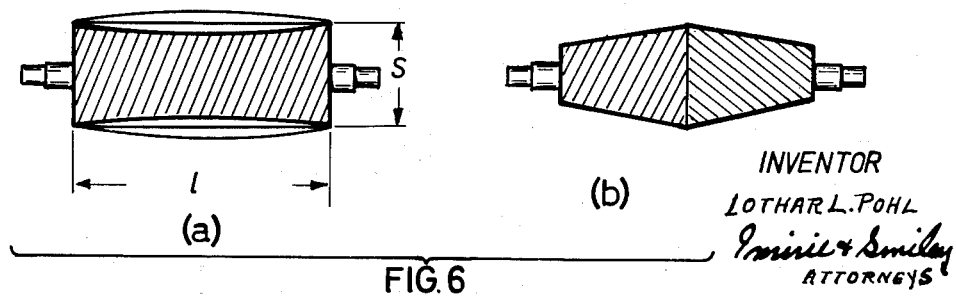
FIG. 6

INVENTOR
LOTHAR L. POHL
ATTORNEYS

United States Patent Office 3,203,182
Patented Aug. 31, 1965

3,203,182
TRANSVERSE FLOW TURBINES
Lothar L. Pohl, 578 Huron St., Toronto,
Ontario, Canada
Filed Apr. 3, 1963, Ser. No. 270,367
4 Claims. (Cl. 60—39.75)

The invention relates to improvements in transverse-flow-turbines.

One object of the invention is to provide a transverse flow turbine, to transform the flow-energy of a gas or fluid medium into mechanical energy, especially a turbine rotor, which performs this transformation in a simple way. The transverse flow-turbine of this invention employs a rotor of compact design, with surfaces of such a shape, that certain rotational moments are produced by a flow over these surfaces, and which is arranged in a turbine in such a way that the flow over this rotor is directed in a particular way.

Known are the transverse flow turbines, where a part of the turbine only is affected by the fluid-throughflow and which are equipped with numerous blades. These are mounted on the periphery, rotating around the common main axis. There are also simple designs where simple plates or cups offer different drag to a fluid flow and therefore are rotated. Such turbine designs are more or less complicated or have lower efficiencies.

The invention is based on the principle that a flow over curved surface exerts on the same a force which is perpendicular to the flow-direction. In an experiment a light hollow sphere can be held free floating in position under an air-jet. If a rectangular surface has such a curvature that the resultant force of the lift is close to the leading edge, a rotational moment axists. If several surfaces of the same shape are attached together one behind the other, and arranged in a closed circle, then these surfaces will rotate around the common axis, because the partial rotation of one surface under flow-action, shifts the following surface into the same angle of attack-position. These action surfaces can be combined to a compact rotor, suitable for very high rotation speeds.

The purpose of the invention is to create a turbine of refined aerodynamic design which is simplified for production and reliable in operation. Further a design is attained which, performing as a gas-turbine, can operate with higher gas-temperatures, therefore with higher thermal efficiencies and which is not readily affected by combustion residuals.

The invention is described in one possible form as a gas-turbine of the small type and consists of:

(I) An air-compressor, preferably a centrifugal type, where the impeller is overhung on the extended turbine main-shaft.
(II) A combustion chamber, arranged as close as possible to the compressor.
(III) The power turbine, consisting of one rotor, representing one turbine stage.
(IV) A flanged reduction gear with auxiliary equipment.

Figure 8:
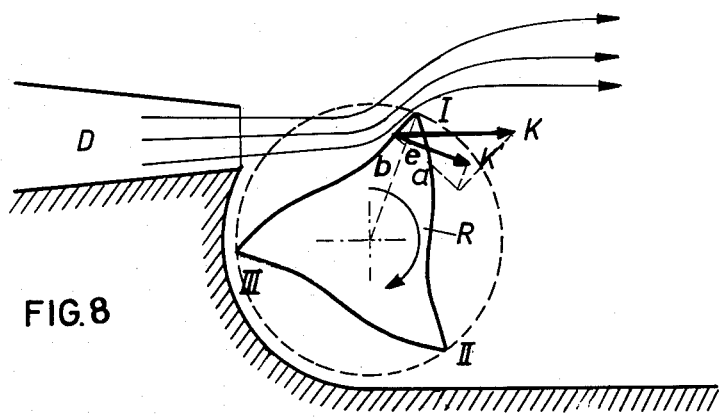
Figure 9:
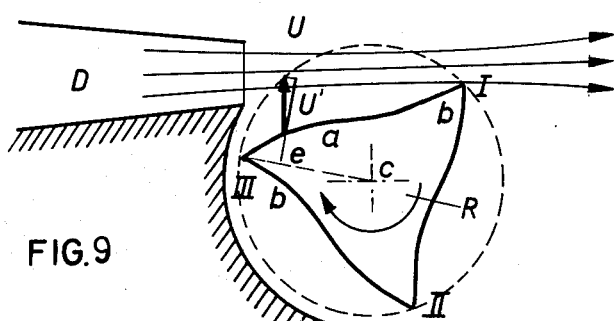

The invention is explained in the following drawings:
FIGURE 1 is a cross-sectional view of a gas-turbine embodying my invention.
FIGURE 2 is a side elevation of FIGURE 1.
FIGURE 3 is a sectional elevation along the line 3—3 of FIGURE 1.
FIGURE 4 is a perspective view of the rotor structure.
FIGURE 5 shows several modifications of the rotor in cross-section, identified as a, b, c, d, e and f respectively.
FIGURE 6 shows two modifications of the rotor in longitudinal section, identified as "a" and "b" respectively.
FIGURES 7, 8 and 9 present schematically the actions of the various driving forces.

In FIGURE 1 the centrifugal compressor I is arranged on the right side of the turbine housing. The combustion chamber II is arranged in horizontal position above the compressor. A curved gas-duct extends to the power turbine III, having the shape of one rotor. On the left side of the turbine housing is arranged the reduction gear IV with the auxiliary equipment.

The inlet nozzle 1 for the fresh air is equipped with a fixed guide vane system 2. The compressor impeller 3 is overhung on a turbine shaft 4. This shaft is supported in the turbine housing wall 5 by a roller bearing 6. This bearing is protected from the exhaust-gases by a labyrinth seal and is provided with cooling oil through the bearing 6. The passageways 9 in the housing 5 receive compressed fresh air to be guided further to the turbine. A cover-plate 10 shields the compressor impeller 3 against the outside and represents also one passage-side wall for the impeller passage 11. The casing of the combustion chamber 12 is attached to the turbine-housing 5 and provides a seat for an ignition device 13. Underneath is positioned the seat for the injection nozzle 14 with the control valve 15, operated by the handwheel 16. On the lower side of the combustion chamber-casing is a drain valve 17 for the excess fuel. The combustion chamber consists of a spherical injection-chamber 18 and a flame chamber 19, which are separated from the outsidewall by fresh-air passages 20. The combustion gases are guided through a curved gas-duct 21 to the turbine rotor 22 and leave the turbine through an outlet 23. The gas-duct 21 is surrounded with fresh-air passages 24. The turbine rotor is mounted on the shaft 4, which on the compressor side is supported by the roller bearing 6 and on the opposite side by a ball bearing 25. This double ball bearing 25 is of the self-aligning type and mounted in the wall of the turbine housing 5. A protective labyrinth-seal 26 and cooling-oil boring 27 are provided. The turbine shaft 4 extends into a gearbox 28. A pinion wheel 29 drives the gear-wheel 30 of the first stage of the reduction gear. The output-power is taken off the pinion wheel 31. Above the gearbox 28 is mounted an oil pump 32.

In FIGURE 2 is presented a side-elevation of the compressor side. The inlet nozzle 1 for the fresh air, with the fixed ring of guide vanes 2, is arranged in the center. The periphery of the compressor impeller 3, is indicated. The circular compressor-coverplate 10 determines the maximum width of the turbine. The casing of the combustion chamber 12 has an oblique position, so that the gas-duct 21 and the outlet 23 are aligned in favorable position to each other. Also the position of the hand-control valve 16 and of the ignition device 13 can be seen.

In FIGURE 3 is shown schematically a section 3—3 through the gas-turbine. The flame-chamber 19 of the combustion chamber and the ignition nozzle 14 can be seen.

Compressed air flows through the surrounding fresh air passages 20 into the combustion chamber. The gas duct 21 tapers off to a nozzle shaped opening 33, in front of which the turbine rotor 22 is arranged, having approximately the cross-section shape of a triangle. The exhaust-gases leave through a bend and the outlet 23 to the free air. The turbine chamber with the turbine rotor 22 is surrounded by fresh-air passages 24. The periphery of the compressor impeller 3 and the cover plate 10 is indicated. In operation, the gas-turbine takes in fresh air through the inlet-nozzle 1 in a usual manner. The guide-vane ring 2 directs the airflow into the vanes of the compressor impeller 3 with a more favorable angle of attack for a special rotation number. In the impeller passages 11 the air is accelerated and compressed and flows through the passageways 9 into the fresh air ducts 24, surrounding the gas duct 21. This means of cooling of the turbine housing 5 and heating of the compressed fresh air by heat-exchange. The fresh air enters the passages 20 and then the injection chamber 18 and the flame chamber 19. Through the injection nozzle 14 the fuel is injected into the chamber 18 in a fine distributed spray, and is mixed with primary fresh air and ignited. In the flame chamber 19 a complete combustion is achieved by additional mixing with fresh air. The combustion gases stream with high speed through the curved gas duct 21 and are accelerated in the nozzle 33, the gas-flow being directed over the turbine rotor 22. This rotor, in consequence of the shape of the rotor surfaces and the particular installation, transforms the energy of the gas-flow into mechanical energy, which can be taken off the pinion 31, after use of a reduction gear.

The design of a compressor and of a combustion chamber of such as gas-turbine is known. In general follows then a radial or axial flow power-turbine. Usual transverse flow turbines of the squirrel-cage type have not been suitable. The common characteristic of all these turbine types is the arrangement of many thin vanes, sometimes of complex shape, or the periphery of a heavy shaft. This represents an expensive and precarious structure wherein the material is stressed to the limit. The novelty of the invention is that a single turbine-rotor of compact and robust design can replace one turbine stage with a plurality of vanes of known type. The structure of a turbine is simplified with short and not complicated gas-ducts. The new turbine-rotor, in consequence of the form, is not so much affected by heat-stress, centrifugal forces and vibrations and the good cooling possibilities are obvious. If the present moderate combustion temperatures are to be used, cheaper materials can be employed, so that new application fields are possible. A general introduction of the gas-turbine in the automobile field appears feasible. In FIGURE 3 is shown the installation of one rotor in the combustion gas-duct where the principle of operation can be recognized also. The gas duct tapers off to a nozzle, in front of which the rotor is mounted in an enlarged conduit in such a way that a turbine part is affected only, the rotor above the shaft is exposed to the stream. The gases, accelerated in the nozzle, flow over the rotor, and dependent on the rotation position of the rotor, various forces are exerted upon the specific surface in contact with the over-flow. This results in periodic rotational moments in the same rotation direction for the rotor, whereby the number of these periodic driving forces, for one rotation, is dependent on the cross-section shape of the rotor. After work is done and heat is exchanged with the fresh air in the passages surrounding the gas duct, the exhaust gases stream out through the enlarged exhaust gas-duct under about outside pressure.

In FIGURE 4 the structure of a triangle rotor is shown, which shall be an example only. To minimize the rotating masses a hollow structure is chosen. On a shaft 34, extending throughout the structure, two sturdy disks are welded which have on the periphery edges with a peculiar curvature. Three mantle surfaces 36 of very heat resistant steel, complete the surfaces to a straight prism with slightly curved mantle-surfaces. As reinforcement, two other supporting surfaces 37 are arranged inside. The shaft 34 is hollow, so that a cooling fluid can enter through the boring 38 and is dispersed through the openings 39 into the interior of the rotor and leaves on the other side. The holes 40 in the supporting surfaces permit the circulation of the cooling fluid.

In FIGURE 5 different rotor shapes are shown which produce similar force-effects. They are differentiated by changes of the cross-section and of the mantle shapes. The shapes 5a, b, c have convex curved sides, whereas the side lengths are reduced with the number of polygon corners, and so also the magnitude of force-effects for one side, while the number of force effects increases for one rotation. In 5d are shown the rotor variations, for example, for a triangle shape, where the sides are either convex, concave curved or straight. In 5e is illustrated a composed shape of the side curvature, to attain highest force-effects in the corresponding rotation positions. In FIGURE 5f an open rotor structure is shown, in which the effective surfaces cover only part of the prismic sides.

In FIGURE 6a are shown the longitudinal sides of a rotor either convex, concave or straight, which can be advantageous for special designs. Also the straight prism rotor can be changed to the form of a cut-off pyramid, so that the rotor has a larger diameter on one side or appears as composite rotor as in FIGURE 6b. The FIGURES 6a and 6b show rotors of a larger side ratio 1:s, but rotors are possible also with side ratios of 1:s=1 and smaller.

The principle of operation of the rotor drive is explained in conjunction with the FIGURES 7, 8 and 9. As an example, the rotor with the cross-section of a triangle is chosen, whereas the described actions are valid also for the variations, mentioned above.

In FIGURE 7 is D a nozzle, wherefrom a flow moves with high velocity across the rotor R. One triangle side of this rotor is composed of a slightly convex curved "a" and a slightly concave curved part "b." The rotation axis C of the rotor is arranged in such a way, that one triangle side can be brought in such position by appropriate rotation of the rotor that the flow moves over the part "a" under a flat angle of attack and that this part can be considered as an extension of the lower nozzle wall. The flow close to the surface in "a" is accelerated and generates a pressure distribution in connection with a pressure drop. A lift-distribution along the surface develops, which can be presented as lift force A in vector form. The component A' is the driving force, perpendicular to the connection line from C to the edge I in the point "e." The rotor is rotated clockwise, while the lift force A increases from a lower magnitude at the start, to a maximum, which depends on the profile form in "a," if the flow is constant, then recedes to zero, if the edge I is about vertical over C.

In FIGURE 8 the rotor has reached such a rotation position that a part "b" of the edge I is affected by the flow and that another flow-force is in action. The dynamic energy of the flow appears as force K in flow direction, so that the component K' can be determined as the driving force. This dynamic force K also increases to a maximum dependent on the rotation position of the rotor, and recedes again, where as the form of the side part "b" has an influence. The ranges of action of the lift-force and of the dynamic force, in relation to the rotation position of the rotor, are not separated distinctly, but are overlapping so that in intermediate positions both forces, one increasing, the other decreasing, contribute to the rotation of the rotor.

In FIGURE 9 the principle of operation of the third driving force is shown. When the rotor edge I has arrived at such a rotation position that neither lift-forces or dynamic forces can be in effect, then such a rotor should come to a standstill, if not such rotation already existed, that rotation-inertia forces would assist to overcome the dead-point position. But a self-start would not be possible in this position. Now, such arrangement of the rotor and the nozzle to each other is possible that, if the rotor edge I is not driven anymore, the rotor edge III has such a position, that nozzle-flow, the rotor triangle side "a" and the casing wall surround a space, where lower pressure is created. This lower pressure can be considered as a suction effect of the passing jet-stream. This low-pressure distribution along the side part "a" is represented by the vector U. Then the rotor is driven by the component U' in "e," also clockwise.

Therefore the rotor is driven by three forces: (1) The lifting force A. (2) The dynamic force K. (3) The under-pressure force U.

These forces appear periodically and successively during one rotation, while the beginning and the end of the various force periods are overlapping each other. For a triangle rotor therefore there are three times three force effects for one rotation. These nine force pulsations together result in smooth rotational moments also with lower rotation numbers. The surface of the rotor mantle, side part "a" and "b" can be formed in such a way that the lift force A and the dynamic force K is of the same magnitude, or that the first or the other one is distinctly preferred. Also the surface form will depend on the flow-medium, whether it may be a gas, steam or fluid. If this rotor is mounted in a housing, then the wall, which forms a continuation of the opposite nozzle wall and extends past the rotor periphery, must have such a design form, that for instance the development of the lift forces is not hampered or affected negatively. This means, that for a certain economical rotation number a calculated design of this housing wall is necessary. For other rotor shapes are similar considerations valid. If the rotor cross-section is the shape of a polygon with five edges, so are fifteen force pulsations, but of lower magnitude, in effect for one rotation.

The invention is explained with the example of a gas-turbine but it is not to be understood in any restricting sense. Fluids of all kinds, even fuels in dustform can be used. Also, if a rotation indication only is wanted this turbine can be employed as a measuring instrument.

What I claim is:

1. In a transverse-flow turbine, an outer casing, a turbine housing mounted within said outer casing and spaced therefrom to provide circulation of air around said housing, said housing having a tapered inlet at its top and having a relatively large outlet through its lower end, a combustion chamber in said tapered end of said housing, an inlet for fuel to said combustion chamber, fuel ignition means, a horizontally disposed rotor shaft extending transversely within said housing and extending beyond said housing at each side of the latter, said rotor shaft being journaled exteriorly of said housing, power take-off means engaging with said shaft at one end of said shaft, means within said housing for restricting the flow fluid downwardly in said housing to a narrow discharge mouth extending transversely of the housing above said rotor shaft, and a rotor mounted on said shaft, said rotor comprising a plurality of angularly related surfaces adapted to be impinged at points near and over the outer edges of said surfaces.

2. In a transverse-flow turbine, an outer casing, a turbine housing within said casing and spaced therefrom to provide air circulation between said casing and said housing, said housing having a top marginal portion curved outwards and tapering into registration with a combustion chamber, a firing chamber, means to supply and regulate fuel to said firing chamber, said housing having a wall portion intermediate of its height inclining inwards and terminating short of the opposing wall to provide a transverse, relatively narrow discharge mouth to discharge gases from said combustion chamber, said first wall from said discharge mouth receding to provide a relatively large outlet for combustion gases, a rotor shaft extending transversely within said housing in parallel with and below said mouth, said shaft being journaled in bearings exteriorly of said housing, a rotor fixed to said shaft in advance of said discharge mouth, said rotor comprising a number of angularly related surfaces adapted to be impinged successively at points remote from said shaft whereby energy of the gas flow from said discharge mouth against the outer surfaces of the rotor in the direction of flow will act to translate energy of the gas flow into mechanical energy and cause rotational moments of the rotor, power take-off means associated with one end of said rotor shaft, an inlet through the outer casing disposed in opposition to the end of said rotor shaft which is remote from said power take-off, air ducts for the passage of air to the space between said outer casing and said rotor housing, and an impeller mounted on the end of said rotor shaft which is opposed to said air inlet, for delivering air from said inlet into said air ducts.

3. A transverse flow turbine, having means to generate a jet stream, a turbine housing with a turbine rotor in the form of a prism, said turbine rotor having at least in part the cross-section of an at least three sided polygon, the coaxial surface of said turbine rotor being curved in flow direction, this curvature deviating moderately from the straight line between two corresponding corners of said cross-section of a coaxial surface, extending from a leading edge to a line substantially medial to the leading and trailing edges, is so formed and positioned that a fluid-flow over and along this coaxial surface, in course of the rotor rotation momentarily inclined with a small angle towards the direction of the fluid-flow, experiences a minimum of turbulence and friction losses in the way, that along this front section being convexly curved, a lift force is developed, consequently a rotational moment, whose magnitude represents a major part of the sum of all driving forces.

4. A transverse flow turbine, having means to generate a jet stream, a turbine housing with a turbine rotor in the form of a prism, said turbine rotor having at least in part the cross-section of an at least three-sided polygon, the coaxial surfaces of said turbine rotor being curved in flow direction, this curvature deviating moderately from the straight line between two corresponding corners of said cross-section, that a fluid flow is allowed to proceed smoothly over and along said surfaces wherein the rear section of a coaxial surface, extending from a line, substantially medial to the leading and trailing edges, to the trailing edge, is so formed and positioned, that a fluid-flow over and along this coaxial surface, in course of the rotor rotation momentarily inclined with a small angle towards the direction of the fluid-flow, experiences a minimum of pressure and direction changes in the way, that in this moment the free outflow of the fluid-medium over this rear-section assists the lift development in the front-section, without producing any significant driving force in consequence of impulse action.

References Cited by the Examiner

UNITED STATES PATENTS

| | | | |
|---|---|---|---|
| 670,759 | 3/01 | Behny | 253—136 |
| 884,984 | 4/08 | Lukens | 253—47 |
| 1,049,288 | 12/12 | Bertram | 253—136 |
| 2,623,353 | 12/52 | Gerard | 60—39.75 |
| 2,651,913 | 9/53 | Hodgson | 60—39.75 |
| 2,663,141 | 12/53 | Hage | 60—39.75 |
| 2,821,067 | 1/58 | Hill | 60—39.75 |
| 3,079,126 | 2/63 | Pohl | 253—134 |

SAMUEL LEVINE, *Primary Examiner.*